(12) United States Patent
Zhang et al.

(10) Patent No.: US 10,826,240 B2
(45) Date of Patent: Nov. 3, 2020

(54) HIGH-VOLTAGE SHIELDED CONNECTOR ASSEMBLY

(71) Applicant: HENAN THB ELECTRIC CO., LTD., Hebi (CN)

(72) Inventors: Hongjuan Zhang, Hebi (CN); Xianjun Zhang, Hebi (CN); Rongxi Wang, Hebi (CN); Guotang Wang, Hebi (CN); Yongan Wang, Hebi (CN); Lina Shao, Hebi (CN); Yongpan Wang, Hebi (CN); Weishun Li, Hebi (CN); Zhibin Sun, Hebi (CN); Qiang Li, Hebi (CN)

(*) Notice: Subject to any disclaimer, the term of this patent is extended or adjusted under 35 U.S.C. 154(b) by 0 days.

(21) Appl. No.: 16/346,311

(22) PCT Filed: Oct. 29, 2017

(86) PCT No.: PCT/CN2017/108202
§ 371 (c)(1),
(2) Date: Apr. 30, 2019

(87) PCT Pub. No.: WO2018/077254
PCT Pub. Date: May 3, 2018

(65) Prior Publication Data
US 2019/0280433 A1    Sep. 12, 2019

(30) Foreign Application Priority Data

Oct. 31, 2016 (CN) .......................... 2016 1 0929758

(51) Int. Cl.
*H01R 13/648* (2006.01)
*H01R 13/639* (2006.01)
(Continued)

(52) U.S. Cl.
CPC ....... *H01R 13/639* (2013.01); *B60R 16/0207* (2013.01); *H01R 13/42* (2013.01);
(Continued)

(58) Field of Classification Search
CPC ............ H01R 13/5219; H01R 13/5221; H01R 13/5208; H01R 2103/00; H01R 13/65802; H01R 13/658
(Continued)

(56) References Cited

U.S. PATENT DOCUMENTS

4,493,525 A * 1/1985 Hall ................... H01R 13/6593
439/607.47
4,854,899 A * 8/1989 Matthews .............. H01R 31/02
439/724
(Continued)

*Primary Examiner* — Thanh Tam T Le
(74) *Attorney, Agent, or Firm* — Novoclaims Patent Services LLC; Mei Lin Wong (57) ABSTRACT

Disclosed is a high-voltage shielded connector assembly. The technical problem to be solved is that existing high-voltage connectors are large in volume, complex to assemble and machine, non-universal, and high in cost. The present invention comprises a socket protection sleeve body, a pin, a socket shielding layer fixed on the socket protection sleeve body and a fixing clip fixing the socket shielding layer, wherein the pin cooperates with the socket protection sleeve body; and the pin comprises a two-layer locking structure formed by a main locking structure and an auxiliary locking structure. After using the above-mentioned technical solution, the present invention uses a high-voltage large-current plate-end shielded connector which is made of plastic and is suitable for new energy automobiles, is low in cost, has high production efficiency, is small in volume, and is simple in wiring harness assembly and processing.

6 Claims, 6 Drawing Sheets

(51) Int. Cl.
*B60R 16/02* (2006.01)
*H01R 13/42* (2006.01)
*H01R 13/502* (2006.01)
*H01R 13/53* (2006.01)
*H01R 13/6581* (2011.01)
*H01R 13/6593* (2011.01)
*H01R 13/6585* (2011.01)
*H01R 13/44* (2006.01)
*H01R 103/00* (2006.01)

(52) U.S. Cl.
CPC ........... *H01R 13/502* (2013.01); *H01R 13/53* (2013.01); *H01R 13/6581* (2013.01); *H01R 13/6585* (2013.01); *H01R 13/6593* (2013.01); *H01R 13/44* (2013.01); *H01R 2103/00* (2013.01); *H01R 2201/26* (2013.01)

(58) Field of Classification Search
USPC ...... 439/271–275, 578, 587, 607.01, 607.28, 439/607.41–607.45
See application file for complete search history.

(56) References Cited

U.S. PATENT DOCUMENTS

| | | | | |
|---|---|---|---|---|
| 5,356,316 | A * | 10/1994 | Anderson | H01R 9/2408 439/724 |
| 5,413,521 | A * | 5/1995 | Terashima | B23D 59/002 125/13.01 |
| 6,422,899 | B1 * | 7/2002 | Miyazaki | H01R 13/5202 439/271 |
| 6,780,068 | B2 * | 8/2004 | Bartholoma | H01R 13/426 439/752 |
| 7,540,772 | B2 * | 6/2009 | Sardi | H01R 13/6592 439/581 |
| 8,167,634 | B2 * | 5/2012 | Fujiwara | H01R 13/5202 439/271 |
| 8,262,413 | B2 * | 9/2012 | Fujiwara | H01R 13/6596 439/607.28 |
| 9,004,946 | B2 * | 4/2015 | Hoeppner | H01R 13/53 439/607.41 |
| 9,166,329 | B2 * | 10/2015 | Eckel | H01R 13/533 |
| 9,437,977 | B1 * | 9/2016 | Belack | H01R 13/648 |

\* cited by examiner

HIGH-VOLTAGE SHIELDED CONNECTOR ASSEMBLY

BACKGROUND OF THE PRESENT INVENTION

Field of Invention

The present invention relates to a component of electrical connector for electric vehicle, and more particularly to a high-voltage shielded connector assembly of which a plate end is provided.

Description of Related Arts

In recent years, due to the breakthrough of battery technology and the support of national policies in China, electric vehicles have developed rapidly.

In the early stages of electric vehicle development, high-voltage connectors on electric vehicles generally used high-voltage connectors of aviation type and metal materials. Although they have high strength and high vibration resistance, there exist problems of: long processing time, poor consistency, and not suitable for large mass production; high processing cost; large volume, complicated assembly process, and not suitable for meeting the low cost, high productivity and small volume requirements of new energy vehicles under the current situation.

The high-voltage connectors of plastic materials on the market are often bulky and the assembly process is complicated, and the 90° and 180° line ends are not universal to the plate end high-voltage shielded connectors, the cost is high, which is not conducive under the current situation for mass production.

SUMMARY OF THE PRESENT INVENTION

The present invention provides a high-voltage shielded connector assembly with low cost, high production efficiency, small volume and simple wire harness and assembly process to solve the technical problems of bulky size, complicate assembly process, incapability of being universal, and high cost of the conventional high-voltage connector.

In order to solve the above technical problems, the present invention implements the following technical solutions: a high-voltage shielded connector assembly, which comprises a socket sheath body, a pin, a socket shield layer mounted on the socket sheath body and a fastening clip securing the socket shield layer into position, the pin and the socket sheath body are fittingly connected with each other; the pin comprises a double-layer locking structure formed by a main lock structure and an auxiliary lock structure.

The socket sheath body comprises a mounting plate, a clip locking surface, an auxiliary locking point, a main locking ring, an anti-fault rib, a contact arm through-hole, a mating surface, and a support surface; the mounting plate has a mounting hole, the main locking ring is fittingly connected with the main lock structure, the auxiliary locking point is fittingly connected with the auxiliary lock structure; the auxiliary lock structure has an annular groove structure or a protruded rib structure.

A polygonal structure is disposed between the main lock structure and the auxiliary lock structure.

The polygonal structure has an arc surface and a flat surface connected to the arc surface.

The socket shield layer comprises a lap joint layer at an outer wall thereof, a locking structure and a zigzag structure at a bottom end of the socket shield layer, a contact arm and a foolproof groove at a bottom portion of the socket shield layer, the foolproof groove is fittingly connected with the anti-fault rib; the contact arm is evenly distributed in a radial direction of the socket shield layer, an outer side of the contact arm has a raised structure, and the contact arm has a sliding surface at one end which is extending at a downward direction.

The contact arm passes through the contact arm through-hole of the socket sheath body to extend to a lower side of the mounting plate, and the sliding surface is in contact with the support surface of the socket sheath body; the zigzag structure penetrates into the mating face of the socket sheath body; a number of the zigzag structure is at least two.

A locking point is arranged at one end of the fastening clip, grooves are arranged at two sides of the locking point, the locking point is matched with the clip locking surface of the socket sheath body.

A shield foolproof structure is provided at an inner wall of the fastening clip, the shield foolproof structure has a shield limit groove therein, the shield foolproof structure I is fittingly connected with the lap joint layer of the socket shield layer, the shield limit groove is fittingly connected with the locking structure of the socket shield layer.

A foolproof structure is disposed at an outer wall of the fastening clip, and a press stop surface is disposed on a top portion of the fastening clip.

A sealing ring is further disposed between the socket sheath body and the pin, an insulating cap is disposed at a head portion of the pin; the socket sheath body further comprises a signal hole.

The present invention adopts a high-voltage and high-current plate end shielded connector made of plastic material and suitable for a new energy vehicle with low cost, high production efficiency, small volume and simple wire harness and assembly process, and capable of meeting the requirements of the rapid development of the new energy vehicles. The present invention has the following advantages: 1. full plastic housing, small size and light weight; 2. Parts and components are formed by molding, product consistency and high production efficiency are ensured; 3. The head portion of the pin is equipped with an insulating cap, which can effectively prevent the finger from touching the pin and its safe use is ensured; 4. the high-voltage shielded connector assembly is shielded continuously to the end appliance, which is realized by employing a raised structure on the shield layer, and the good shielded conduction between the two are ensured; 5. Through the zigzag structure and the fixation clip connector of the shield layer, the integral design of the shield layer and the socket sheath body are realized, and the lateral fastening force and the axial retaining force of the shield layer is increased to improved the product quality; 6. The two sides of the outer housing of the socket sheath body has a high and low drop design, which can realized the matching of both the 90° and 180° plug sheath in small size.

DESCRIPTION OF NUMERICAL REFERENCES 1 high-voltage shielded connector;
2 socket sheath body, 201 mounting plate, 202 mounting hole, 203 clip locking surface, 204 auxiliary locking point, 205 main locking ring, 206 anti-fault rib, 207 contact arm through-hole, 208 signal hole, 209 mating surface, 210 support surface, 211 signal sidewall;
3 pin, 301 main lock structure, 302 polygon structure, 303 auxiliary lock structure, 304 insulating cap, 305 arc surface, 306 flat surface;
4 socket shield layer, 401 locking structure, 402 zigzag structure, 403 contact arm, 404 raised structure, 405 foolproof groove, 406 lap joint layer, 407 sliding surface;
5 fastening clip, 501 locking point, 502 groove, 503 shield foolproof structure, 504 foolproof structure, 505 shield limit groove, 506 press stop surface;
7 sealing ring.

DETAILED DESCRIPTION OF THE PREFERRED EMBODIMENT

Referring to FIG. 1 to FIG. 6 of the drawings, a high-voltage shielded connector assembly 1 of the present invention comprises a socket sheath body 2, a pin 3, a socket shield layer 4 mounted on the socket sheath body 2 and a fastening clip 5 for securing the socket shield layer 4 into position, the pin 3 and the socket sheath body 2 are fittingly connected with each other; the pin 3 comprises a double-layer locking structure formed by a main lock structure 301 and an auxiliary lock structure 303. After the assembly is in place, the main lock structure 301 is interference-fitted with a circumferential ring of the main locking ring 205 of the socket sheath body, the auxiliary lock structure 303 has an annular groove structure or a rib structure and is fittingly connected to the auxiliary locking point 204 of the socket sheath body when in use. The double-layer locking structure of the pin greatly increases the fastening force of the pin in the socket sheath body, and the connection with the socket sheath body to form an integral body, so that the connection in the sheath is more reliable to ensuring safe use and improving product quality.

Figure 4:
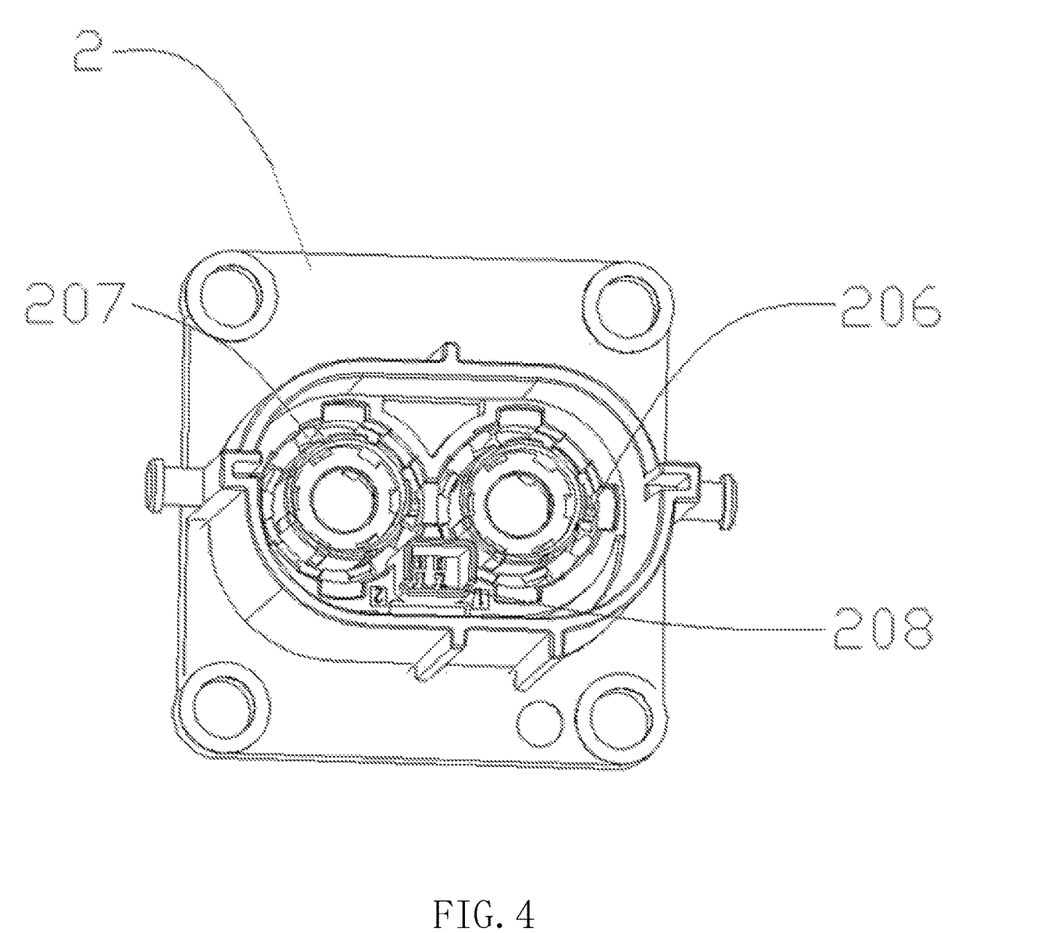
FIG. 4 is a schematic structural diagram of the socket sheath body of the present invention.

The socket sheath body 2 comprises a mounting plate 201, a clip locking surface 203, an auxiliary locking point 204, a main locking ring 205, a anti-fault rib 206, a contact arm through-hole 207, a mating surface 209, and a support surface 210, the mounting plate 201 has a mounting hole 202, the main locking ring 205 is fittingly connected with the main lock structure 301, the auxiliary locking point 204 is fittingly connected with the auxiliary lock structure 303. The mounting hole includes a bushing therein, and the connection between the connector and the end appliance can be achieved by bolts.

The auxiliary lock structure 303 has an annular groove structure or a protruded rib structure.

A polygonal structure 302 is disposed between the main lock structure 301 and the auxiliary lock structure 303. This structure can effectively prevent any rotational movement of the pin in the main body; when a tail portion of the pin is a structure that needs to ensure a single orientation, it can effectively prevent mis-installation.

The polygonal structure 302 includes an arc surface 305 and a flat surface 306 extended from the arc surface 305.

Figure 5:
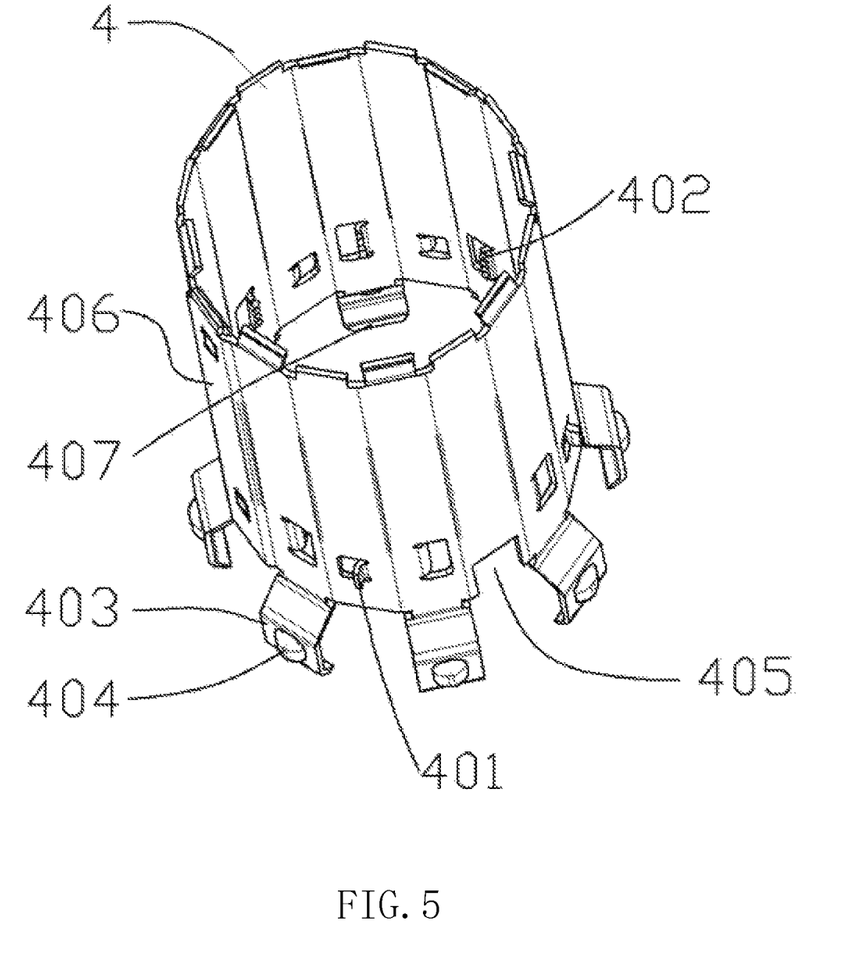
FIG. 5 is a schematic structural diagram of the socket shield layer of the present invention.

The socket shield layer 4 includes a lap joint layer 406 at an outer wall thereof, a locking structure 401 and a zigzag structure 402 at a bottom end thereof, a contact arm 403 and a foolproof groove 405 at a bottom portion thereof, the foolproof groove 405 is fittingly connected with the anti-fault rib 206; the contact arm 403 is evenly distributed in the radial direction of the socket shield layer 4, an outer side of the contact arm 404 has a raised structure 404, an end of the contact arm 403 has a sliding surface 407 which is extending at a downward direction; the structure of the contact arm 403 is used for continuous electrical contact shielding, the raised structure 404 is disposed on a protruded flat surface of the contact arm 403; the foolproof groove 405 and the anti-fault rib 206 are fittingly connected with each other so that mis-installation of the socket shield layer 4 is prevented.

The contact arm 403 pass through the contact arm through-hole 207 of the socket sheath body 2 to extend to a lower side of the mounting plate 201, and the sliding surface 407 is in contact with the support surface 210 of the socket sheath body; the raised structure 404 of the socket shield layer is pressed into contact with the mating hole of the metal housing of the end appliance, this structure can avoid the poor contact between the wire and the circle, and ensures a good shielded continuity between the high voltage shielded connector and the end appliance; the end of the elastic arm of the socket shield layer has a downwardly extending sliding surface 407, during use, the sliding surface is in contact with the support surface 210 of the socket sheath body to ensure that a good electrical contact between the raised structure and the end appliance and providing a continuous positive pressure.

The zigzag structure 402 penetrates into the mating face 209 of the socket sheath body 2; there are at least two zigzag structures 402. When assembled, the zigzag structure 402 penetrates into the material of the mating face 209 of the socket sheath body, which can greatly increase the axial and lateral fastening force of the shield layer, at least two zigzag structures are provided in the radial direction, preferably having a uniform distribution, or a non-uniform distribution.

Figure 6:
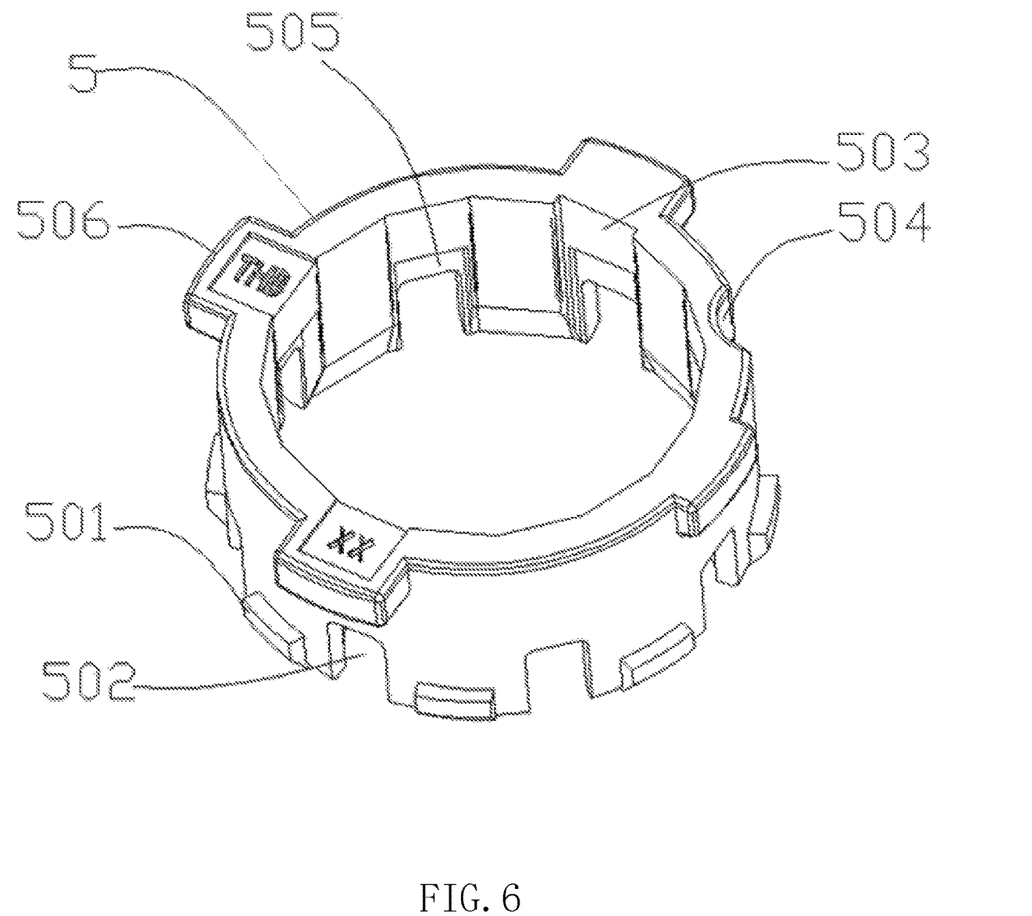
FIG. 6 is a schematic structural diagram of the fastening clip of the present invention.

The locking point 501 is arranged at the end of the fastening clip 5, the groove 502 is arranged at two sides of the locking point 501, the locking point 501 is matched with the clip locking surface 203 of the socket sheath body 2; thereby realizing the socket sheath body 2 and the socket sheath body 2 to secure into position, thus realizing the fixing of the shield layer to the socket sheath body 2 through the fastening clip.

The shield foolproof structure 503 is provided at an inner wall of the fastening clip 5, the shield foolproof structure 503 has a shield limit groove 505 therein, the shield foolproof structure 503 is fittingly connected with the lap joint layer 406 of the socket shield layer, the shield limit groove 505 is fittingly connected with the locking structure 401 of the socket shield layer; the shield foolproof structure 503 is matched with the lap joint layer 406 to provide a yield or foolproof function; the locking structure 401 is inserted into the shield limit groove 505 of the fasting clip to limit the movement of the fastening clip relative to the socket shield layer in the downward direction.

The outer wall of the fastening clip 5 is provided with a foolproof structure 504; the foolproof structure 504 can yield to the housing of the signal sidewall 211 of the socket sheath body, and at the same time play the role of fixed orientation assembly.

The press stop surface 506 is arranged on a top portion of the fastening clip 5. During the assembly process, the tooling head can be pressed onto the press stop surface for the ease of assembly. During the assembly process, the zigzag structure 402 of the socket shield layer is interference-fitted with the mating surface 209 of the socket sheath body, and can penetrate into the mating surface of the body to increase the lateral fastening force and the axial retaining force of the shield layer, the fastening clip structure outside the shield layer can effectively prevent the zigzag structure from expanding outward so that the depth of penetration of the sawtooth is ensured. There are at least two zigzag structures in the radial direction, and the more the number, the more uniform the distribution, the better the fastening effect and the greater the axial retention force. The fastening clip has a groove 502 structure provided at two sides of the locking point at the end thereof as well as a yield structure at the inner side thereof, thus the assembly force of the fastening clip can be reduced and damages to the locking point during assembly is prevented. There are a plurality of locking points, which can be extended radially evenly or unevenly.

Figure 1:
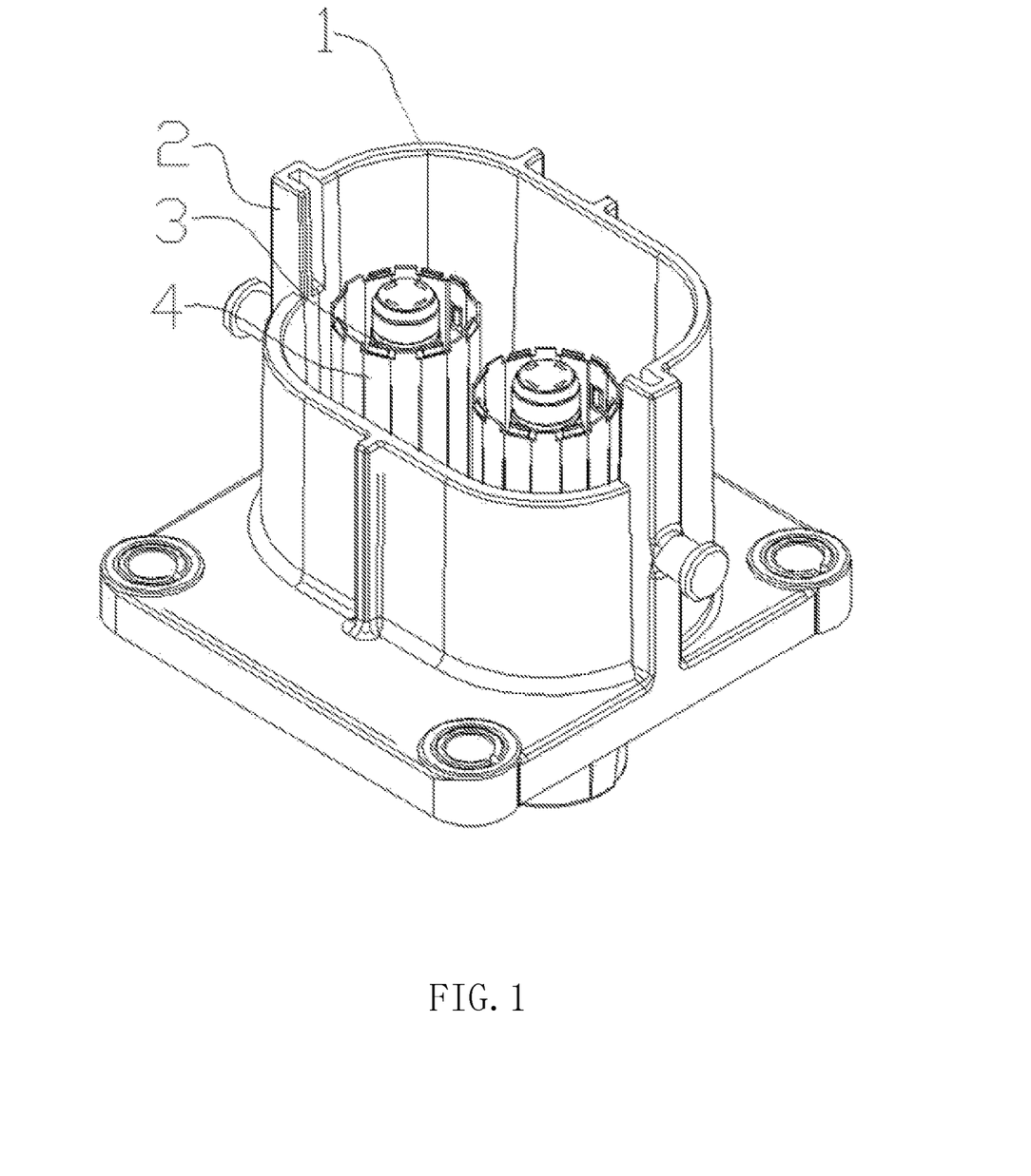
FIG. 1 is a schematic structural diagram of the present invention after the assembly is completed.
Figure 2:
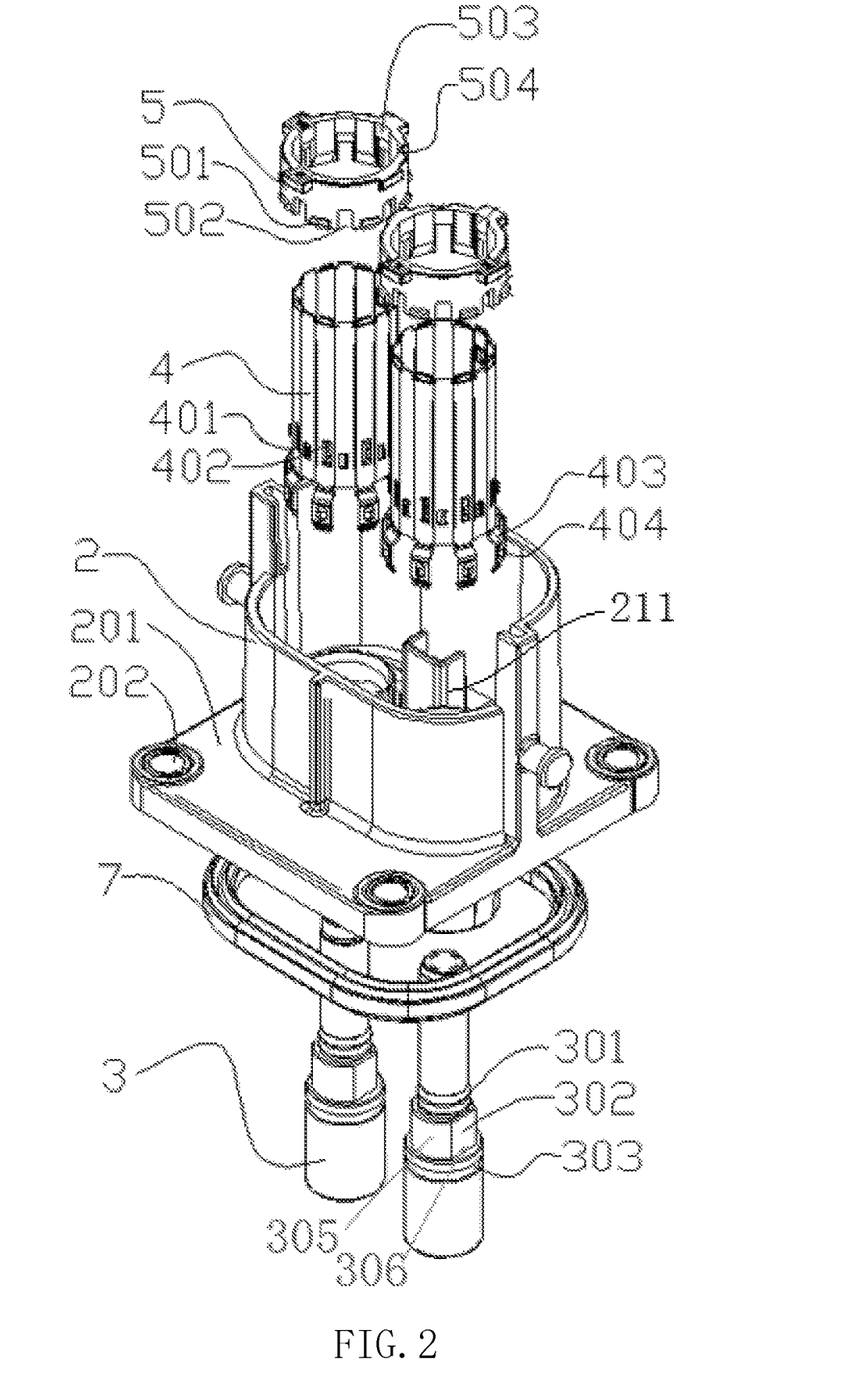
FIG. 2 is a schematic exploded view of the present invention.
Figure 3:
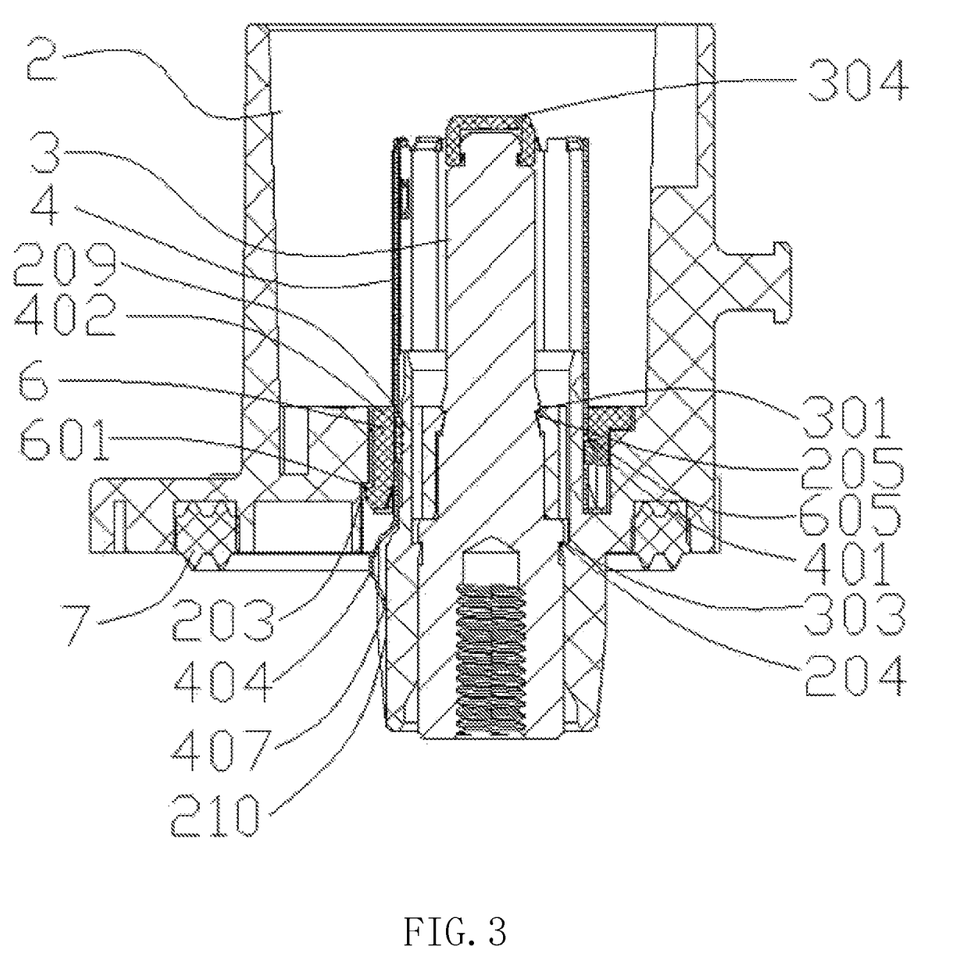
FIG. 3 is a schematic sectional structure diagram of the present invention after the assembly is completed.

A sealing ring 7 is further disposed between the socket sheath body 2 and the pin 3. The lower end surface of the mounting plate has a mounting groove for the sealing ring 7 for installation of the sealing ring, and the sealing between the high-voltage shielded connector assembly and the end appliance is realized by the pressing of the end surface.

The head of the pin 3 is provided with an insulating cap 304. The insulating cap 304 can prevent the finger from touching the metal surface of the head of the pin in the high-voltage shielded connector, thereby ensuring the personal safety of the operator.

The socket sheath body 2 is further provided with a signal hole 208. The signal hole 208 has a function of conducting a signal, and cooperates with the corresponding plug sheath body to realize the control of the continuity of the main power circuit with a signal loop through the height difference design to ensure the safety of use.

What is claimed is:

1. A high-voltage shielded connector assembly, comprising a socket sheath body (2), a pin (3), a socket shield layer (4) mounted on said socket sheath body (2) and a fastening clip (5) securing said socket shield layer (4) into position, said pin (3) and said socket sheath body (2) are fittingly connected with each other; said pin (3) comprises a double-layer locking structure formed by a main lock structure (301) and an auxiliary lock structure (303), said socket sheath body (2) comprises a mounting plate (201), a clip locking surface (203), an auxiliary locking point (204), a main locking ring (205), an anti-fault rib (206), a contact arm through-hole (207), a mating surface (209), and a support surface (210); said mounting plate (201) has a mounting hole (202), said main locking ring (205) is fittingly connected with said main lock structure (301), said auxiliary locking point (204) is fittingly connected with said auxiliary lock structure (303); said auxiliary lock structure (303) has an annular groove structure or a protruded rib structure.

2. The high-voltage shielded connector assembly according to claim 1, said socket shield layer (4) comprises a lap joint layer (406) at an outer wall thereof, a locking structure (401) and a zigzag structure (402) at a bottom end of said socket shield layer (4), a contact arm (403) and a foolproof groove (405) at a bottom portion of said socket shield layer (4), said foolproof groove (405) is fittingly connected with said anti-fault rib (206); said contact arm (403) is evenly distributed in a radial direction of said socket shield layer (4), an outer side of said contact arm (404) has a raised structure (404), and said contact arm (403) has a sliding surface (407) at one end which is extending at a downward direction.

3. The high-voltage shielded connector assembly according to claim 2, said contact arm (403) pass through said contact arm through-hole (207) of said socket sheath body (2) to extend to a lower side of said mounting plate (201), and said sliding surface (407) is in contact with said support surface (210) of said socket sheath body; said zigzag structure (402) penetrates into said mating face (209) of said socket sheath body (2); a number of said zigzag structure (402) is at least two.

4. The high-voltage shielded connector assembly according to claim 3, a locking point (501) is arranged at one end of said fastening clip (5), grooves (502) are arranged at two sides of said locking point (501), said locking point (501) is matched with said clip locking surface (203) of said socket sheath body (2).

5. The high-voltage shielded connector assembly according to claim 4, a shield foolproof structure (503) is provided at an inner wall of said fastening clip (5), said shield foolproof structure (503) has a shield limit groove (505) therein, said shield foolproof structure I (503) is fittingly connected with said lap joint layer (406) of said socket shield layer, said shield limit groove (505) is fittingly connected with said locking structure (401) of said socket shield layer.

6. The high-voltage shielded connector assembly according to claim 5, a foolproof structure (504) is disposed at an outer wall of said fastening clip (5), and a press stop surface (506) is disposed on a top portion of said fastening clip (5).

* * * * *